(12) United States Patent
Kaufmann et al.

(10) Patent No.: US 7,215,810 B2
(45) Date of Patent: May 8, 2007

(54) METHOD FOR CREATING SINGLE 3D SURFACE MODEL FROM A POINT CLOUD

(75) Inventors: Markus Kaufmann, Berlin (DE); Peer Sporbert, Berlin (DE); Phillip Getto, Plano, TX (US)

(73) Assignee: OraMetrix, Inc., Richardson, TX (US)

( * ) Notice: Subject to any disclaimer, the term of this patent is extended or adjusted under 35 U.S.C. 154(b) by 833 days.

(21) Appl. No.: 10/626,795

(22) Filed: Jul. 23, 2003

(65) Prior Publication Data

US 2005/0018901 A1    Jan. 27, 2005

(51) Int. Cl.
*G06K 9/00* (2006.01)
(52) U.S. Cl. ...................... 382/154; 382/131
(58) Field of Classification Search ............... 382/154, 382/128–132, 294; 345/419, 420, 423; 702/150–155; 703/2–6, 11; 700/98; 433/2, 24, 213–215; 356/3.01–3.03, 601–603
See application file for complete search history.

(56) References Cited

U.S. PATENT DOCUMENTS

| | | | |
|---|---|---|---|
| 5,615,003 A | 3/1997 | Hermary et al. | 356/3.03 |
| 5,988,862 A | 11/1999 | Kacyra et al. | 703/6 |
| 6,266,453 B1 | 7/2001 | Hibbard et al. | 382/294.31 |
| 6,405,151 B1 | 6/2002 | Fujii et al. | 702/155 |
| 6,463,344 B1 | 10/2002 | Pavloskaia et al. | 700/98 |
| 6,466,892 B2 | 10/2002 | Fujii et al. | 702/150 |
| 6,542,249 B1 | 4/2003 | Kofman et al. | 356/661 |
| 6,549,288 B1 | 4/2003 | Migdal et al. | 356/603 |
| 6,553,138 B2 | 4/2003 | Rozin | 382/154 |
| 6,650,324 B1* | 11/2003 | Junkins | 345/423 |
| 6,968,299 B1* | 11/2005 | Bernardini et al. | 703/2 |
| 7,004,754 B2* | 2/2006 | Kaufmann et al. | 433/213 |

FOREIGN PATENT DOCUMENTS

| | | |
|---|---|---|
| JP | H9-21620 | 1/1997 |
| JP | 2000113193 | 4/2000 |
| WO | WO 0180761 | 11/2001 |

OTHER PUBLICATIONS

Sun et al., Triangle Mesh-Based Surface Modeling Using Adaptive Smoothing and Implicit Surface Texture Integration, IEEE 0-7695-1521-5/02, pp. 1-10.*

* cited by examiner

*Primary Examiner*—Ishrat Sherali
(74) *Attorney, Agent, or Firm*—McDonnell, Boehnen, Hulbert & Berghoff LLP

(57) ABSTRACT

A single surface representation is created from a cloud of points. Each point in the cloud of points is assigned three-dimensional spatial coordinates. The cloud of points is stored in a memory of a computer. Machine-executable instructions are provided for the computer that operate on the cloud of points. The instructions construct an initial triangle from the cloud of points. The instructions construct a multitude of adjacent triangles forming a single continuous surface representing the object. The triangles comprise planar surfaces having three vertices. The vertices of the adjacent triangles comprise the three points forming the initial triangle and a multitude of other points. Except for the initial two points, the points forming the triangles are each computed as a weighted average of a set of nearby points in the cloud of points that satisfy selection criteria. The resulting vertex also has to satisfy one or more selection criteria. The final weighted average surface representation requires much less data to represent the object surface than the initial point cloud.

20 Claims, 12 Drawing Sheets

METHOD FOR CREATING SINGLE 3D SURFACE MODEL FROM A POINT CLOUD

BACKGROUND OF THE INVENTION

A. Field of the Invention

This invention relates generally to the field of modeling three-dimensional objects in a computer and more particularly to a method for generating a single continuous surface or mesh representing the object from a cloud of points.

B. Description of Related Art

Computers can be used to generate virtual three-dimensional models of objects. Such models can be represented in a variety of ways. One common way is as a continuous surface of adjacent triangles. The triangles are planar surfaces defined by three points. The points form vertices of the triangles. The points have known three-dimensional coordinates.

In some applications, the construction of a single surface representing an object from a cloud of points can be quite difficult since the cloud of points may have "noise", i.e., points whose 3D coordinates are inaccurate or stray, and the cloud of points may be relatively inhomogeneous.

U.S. Pat. No. 6,463,344 describes a method for representation of a surface of a tooth, but the method is quite different from the present method. The method of the '761 is based on a parameterization of the surface, based on a predefined grid defined by parameters u, v. The present method does not depend on parameters and a predefined grid.

Published PCT application WO 01/80761, assigned to OraMetrix, Inc., assignee of the present invention, describes a scanner for scanning teeth and a method of constructing a cumulative registration model of the teeth from scan data comprising a cloud of points. The entire contents of WO 01/80761 is incorporated by reference herein. The application describes a method for constructing a single continuous surface representation of the teeth, but uses extraneous virtual tooth models retrieved from memory in this process. The present invention, in contrast, does not require extraneous virtual objects to construct the single surface representation.

SUMMARY OF THE INVENTION

In a first aspect, a method is provided for creating a surface representation of a three-dimensional object from a cloud of points. Each point in the cloud of points is assigned three-dimensional spatial coordinates. The cloud of points and the three-dimensional coordinates of the points can be obtained using any method. One possibility is scanning the object with a 3D scanner (such as an optical or laser scanner) and storing the scan data in memory. The nature of the representation of the cloud of points is not particularly important.

The method includes the step of storing the cloud of points in a memory of a computer. The method further includes the step of providing machine-executable instructions for the computer that operate on the cloud of points. The instructions construct an initial triangle from the cloud of points. In one embodiment, the initial triangle consists of two points from the cloud of points and a third point, which could either be a third point in the cloud of points or more preferably a point selected as a weighted average of a set of points in the vicinity of the two points. The selection of the set of points used to construct the third point is in accordance with a selection criteria described below, that maximizes data reduction while minimizing deviation of the initial triangle from the point cloud.

The method continues with constructing a multitude of adjacent triangles forming a single continuous surface representing the object. The triangles comprise planar surfaces having three vertices. The vertices of the adjacent triangles comprise the three points forming the initial triangle and a remainder of points, are each computed as a weighted average of nearby points in the cloud of points. The points in the set of points used to construct each new vertices satisfy selection criteria (as was the case with the initial third point), and the new vertex itself is tested against rejection criteria described herein such only new vertices are chosen that minimize surface deviation in the new triangle using the new vertex from the point cloud As such, the final surface representation is a weighted average surface representation which requires much less data to represent the surface than the initial point cloud, since it reduces the number of points to represent the surface down to only the vertices. Since each vertex (other than the two vertices of the initial triangle) is a weighed average of nearby points, the final surface configuration is a weighted average surface.

In one possible embodiment, the initial cloud of points is a set of points obtained from a scan of the object with a three-dimensional scanner. The object could be an anatomical structure (e.g., teeth or a model of teeth) in one possible embodiment. The method may continue with a step of displaying the surface representation on a computer monitor.

In another aspect, a method is provided for creating a surface representation of a three-dimensional object. The method includes the steps of:

a) scanning the object with the scanner;

b) storing scan data in a memory of a computer, the scan data comprising a cloud of points, each point having three-dimensional spatial coordinates;

c) constructing, with the computer, an initial triangle from first, second and third points, wherein the first and second points are selected from the scan data and the third point is a weighted average of a set of points in the scan data, and the set of points satisfy selection criteria;

d) "deleting" the points used to create the third point, i.e., marking them and excluding them from the rest of the modeling procedure;

e) selecting an open edge in the initial triangle and constructing, within the computer, an adjacent triangle to the initial triangle, the adjacent triangle sharing the open edge with the initial triangle and having a new vertex, wherein the new vertex is a weighted average of a set of points in the scan data; the set of points used to create the new vertex are selected using a selection criteria and the new vertex itself is tested against rejection criteria described herein such that the new vertex is chosen that minimizes surface deviation in the new triangle using the new vertex from the point cloud;

f) "deleting" the points in the set of points used to create the new vertex, i.e., marking them and excluding them from the rest of the modeling procedure; and g) successively repeating steps e) and f), to thereby construct within the computer successive adjacent triangles to open edges of previously constructed triangles using remaining undeleted points in the scan data, and forming triangles by open edges of adjacent triangles in accordance with a set of predefined rules for generating triangles from open edges, wherein each of the points of the adjacent triangles except for the first and second points are a weighted average of the points in the scan data, whereby a composite, single, weighted average surface is generated from the initial triangle and the successive adjacent triangles.

In this embodiment, the method preferably uses a list of triangles constructed with the computer, a list of open edges, a list of closed edges, and a list of the points in the cloud of points. The open edges are line segment forming an edge of a triangle (or joining the first two points in the initial triangle) in which the line segment is not a common edge of two adjacent triangles. As additional triangles are created, the list of triangles is updated and the points used to create the vertices of the triangles are marked and not further used in the modeling procedure. The list of open edges is also updated as new triangles are created. As the new triangles are created, open edges become common to two triangles, they become "closed" and added to the list of closed edges. These features permit the method to execute in a rapid, iterative manner until all open edges have been tested for possible inclusion in a new triangle, and all available points in the point cloud have been tested for usage as a new vertex in a new triangle.

In still another aspect, a method is provided for creating a surface representation of a three-dimensional object scanned with a scanner, comprising the steps of scanning the object with the scanner; storing scan data in a memory of a computer, the scan data comprising a cloud of points, each point having three-dimensional spatial coordinates; and constructing within the computer an initial triangle derived from points in the scan data. The method continues with the step of repeatedly constructing within the computer adjacent triangles, the adjacent triangles having at least one common edge with a previously constructed triangle. The adjacent triangles have vertices comprising either the points forming the initial triangle or new vertices (points) constructed from a weighted averaged of points in the scan data in the region of the vertices and which satisfy predetermined selection criteria for vertices, such as they do not exceed a maximum distance from an open edge of a previously generated triangle or from a previous vertex. The surface representation comprises the initial triangle and the adjacent triangles.

In still another aspect, a method is provided for creating a surface representation of a three-dimensional object from a cloud of points, each point having three-dimensional spatial coordinates. The method comprises the steps of storing the cloud of points in a memory of a computer and storing, in the memory of the computer, a list of points comprising the cloud of points and a list of open edges. The method further comprises the step of providing machine executable instructions for the computer that operate on the cloud of points, the instructions:

1) constructing an initial open edge from points in the cloud of points;
2) constructing a triangle forming a portion of the surface representation from the open edge using predetermined rules for generating triangles forming the surface representation;
3) adjusting the list of open edges in view of the construction of the triangle;
4) checking to see if there are open edges that have not been tried yet to form a triangle forming a portion of the surface representation, and if so, repeating steps 2) and 3);
5) as steps 2), 3) and 4) execute, adjusting the list of points by marking the points in the list of points that are used to generate vertices of triangles in step 2) and not using them further in the modeling procedure; and
6) repeatedly iterating steps 2), 3), 4) and 5) until the instructions have attempted to generate triangles from all open edges in accordance with the predetermined rules for generating triangles, and the instructions have attempted to generate a vertex of a new triangle from all remaining points in the list of points in accordance within predetermined rules for generating vertices of triangles forming the surface.

These and other aspects and features of the present invention will be understood by reference to the following detailed description of a presently preferred embodiment and by reference to the accompanying drawing figures.

BRIEF DESCRIPTION OF THE DRAWINGS

Presently preferred embodiments of the invention are described below in reference to the appended drawings, wherein like reference numerals refer to like elements in the various views, and in which.

DETAILED DESCRIPTION OF PREFERRED EMBODIMENTS

Figure 1:
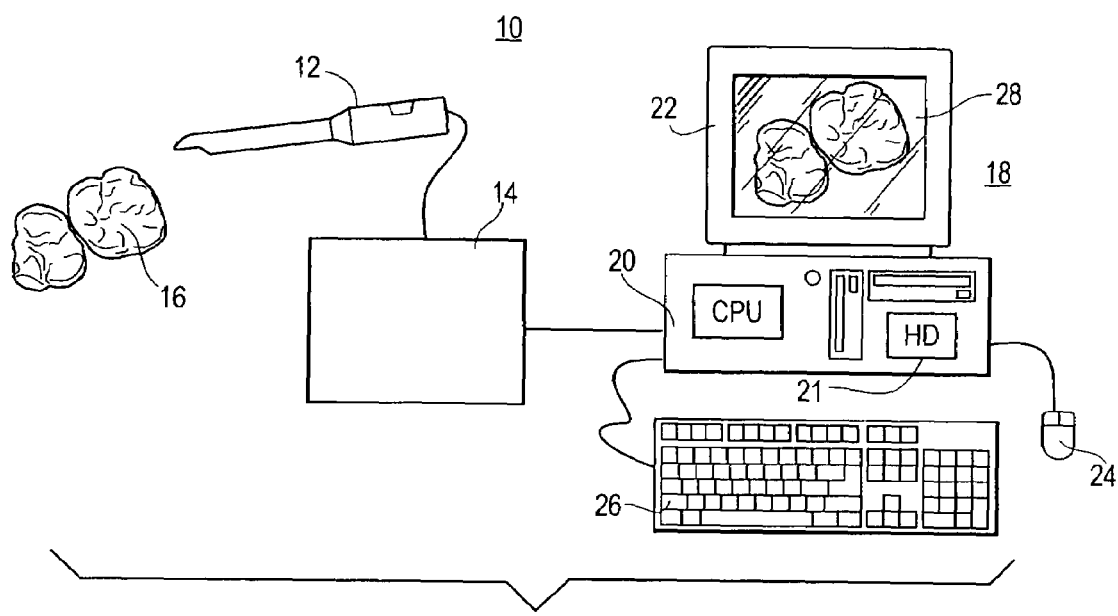
FIG. 1 is a schematic diagram of one possible environment in which the invention can be practiced, showing a scanner that scans an object and a computer which stores scan data in the form of a cloud of three dimensional points and generates a single mesh surface representation of the scanned object.

FIG. 1 is a schematic diagram of one possible environment in which the invention can be practiced. A scanner 10 consisting of an optical probe unit 12 and scanner electronics module 14 conducts a 3D scan of an object 16. The object 16 can be virtually anything, including anatomical structures such as teeth or other intra-oral structures. The present invention is not limited to any particular type of scanner or object, and the scanner could be a laser scanner. In the illustrated embodiment, the scanner is a hand-held in-vivo scanner as described in the published PCT application of OraMetrix cited previously. An opaquing solution may be applied to the surface to be scanned to enhance the ability to scan an object in a "wet-field" environment, as taught in the patent application of Nancy Butcher et al., Ser. No. 10/099, 042, filed Mar. 14, 2002, the contents of which are incorporated by reference herein.

The scanner 10 obtains scan data describing the surface configuration and shape of the object 16. The scanner electronics module 14 includes a computer that converts data from the probe 12 into a point cloud, each point in the cloud having three-dimensional coordinates. The above-cited PCT application contains a description of a method of generating point cloud data, in a form of a series of individual three-dimensional "frames", which are in turn registered to each other in a best fit manner to form a complete 3D point cloud model of the object. The reader is directed to the PCT document for a description of the generation of the point cloud. The scan data is transmitted to a general-purpose computer 18, which includes a central processing unit 20, a hard disk memory 21, and a user interface consisting of a monitor or display 22, a mouse 24, and keyboard 26. The scan data (point cloud) is stored in the hard disk memory 21 of the computer. The computer also includes machine executable instructions, described herein, for processing the points in the point cloud and generating a single mesh surface configuration representing the scanned object. The single mesh surface is shown displayed on the computer monitor 22, as indicated at 28. The mouse and keyboard provide a means by which the user accesses the 3D surface generation software and initiates the processing, and then manipulate, study, measure, or otherwise use the resulting 3D surface.

Figure 2:
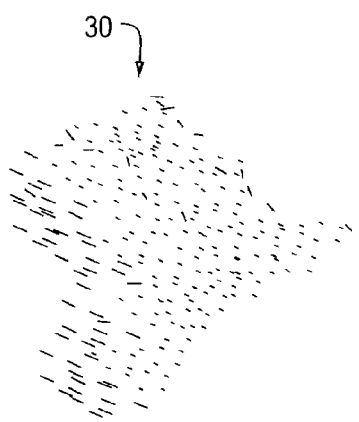
FIG. 2 shows a cloud of points that are stored in a computer and which represent the three-dimensional surface of the object scanned in FIG. 1.
Figure 3:
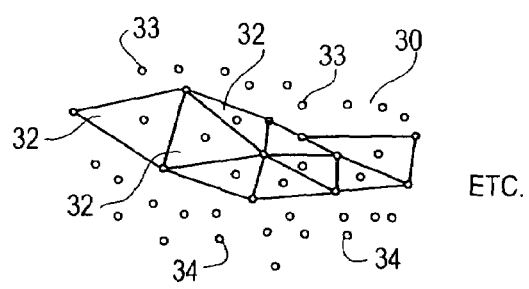
FIG. 3 shows a surface consisting of adjacent triangles that represent a portion of the surface of the object of FIG. 2, indicating in a some what simplified manner the objective of the present invention to provide a single surface representing the object from a cloud of points, and presenting a weighted average of all the points in the point cloud.

FIG. 2 shows an example of a 3D point cloud 30 that may be captured by the scanner of FIG. 1. FIG. 3 shows a close-up view of a portion of the point cloud 30. In the present example, the point cloud 30 consists of thousands or even millions of individual points in three-dimensional space. Depending on the quality of the scanner or the scanning, the model may have lots of noise in the form of stray points, it may be inhomogeneous, and it may have many points at different depths over a given area, such that selection of a points to use to construct a surface model is difficult. This is particularly so if the source data is obtained from a cumulatively registered model constructed from hundreds or thousands of individual frames (each frame covering only a portion of the object). Each of these individual frames consists of 3D measured points and triangles which reference these measured points, each triangle linking points that lay next to each other in the 3D surface or mesh. Owing to measuring errors and errors during registration, the points of a registered scan form a noisy cloud of points along the virtual surface of the scanned object. The point density on a certain area of the surface is dependent on the number of individual frames carried out on this area (=number of triangle layers on this area) and on the recording angle of these individual scans.

The object of the procedure of this invention is to generate from this cloud of points a new boundary or surface representation consisting of points and triangles which, as far as possible, consists exactly of one layer on every area of the surface of the scanned object. This is indicated in FIG. 3 by the continuous triangle surface. Preferably, the point density in the surface representation depends not on the point density of the source data, but on the surface curvature. This way, a maximum measure of data reduction is to be achieved with a minimum measure of distortion of the source data. Further analysis and processing of the 3D data is facilitated by replacing the original data (point cloud), consisting of locally limited surface portions with multiple-layer overlapping, with the new surface configuration, consisting of a single-layer surface which has both a maximum measure of coherence, and which also represents a surface in the topological sense. This is shown in a somewhat simplified form in FIG. 3: from the cloud of points 30, a new surface consisting of connecting, adjacent triangles 32 is constructed. Points in the original cloud of points include both points 33 and 34 above and below the surface, respectively. As will be explained below, the surface consisting of triangles 32 (or, equivalently, the associated set of points forming the vertices of these triangles) represents a weighted average of the point cloud. Further processing or analysis of the surface consisting of triangles 32 is much easier and efficient than processing the entire point cloud 30.

In general, the vertices of the triangles 32 forming the single mesh surface are not points in the point cloud, but rather they are newly-constructed vertices formed as a weighted average of a set of nearby points that satisfy selection criteria; moreover, the vertices of the triangles are tested against rejection criteria described herein in order to insure that the triangle surface conforms to the point cloud with a minimum of deviation. The manner of selecting the set of points used to construct the new vertices of the triangles 32 and testing the new vertex to see if it should be used are explained in detail in conjunction with FIGS. 10A–10E.

Referring now to FIG. 4A–4G, a method will now be described for constructing a surface from a cloud of points in a preferred embodiment of the invention. As noted earlier, each point in the cloud of points is assigned three-dimensional spatial coordinates. The cloud of points and the three-dimensional coordinates of the points can be obtained using any method, one possibility is scanning the object with a 3D scanner (such as an optical or laser scanner) and storing the scan data in memory. The nature of the representation of the cloud of points is not particularly important.

The method includes the step of storing the cloud of points in a memory (e.g., hard disk 21) of a computer 18. The method further includes the step of providing machine-executable instructions for the computer that operate on the cloud of points 30. The instructions construct an initial triangle from the cloud of points. This will be described in conjunction with FIGS. 4A and 4B below. In one embodiment, the initial triangle consists of two points from the cloud of points and a third point, which could either be a third point in the cloud of points or more preferably a point selected as a weighted average of a set of points in the vicinity of the two points, and in which the selection criteria for the set of points used to construct the third point satisfies selection criteria described later in this document.

The method continues with constructing a multitude of adjacent triangles forming a single continuous surface representing the object. Preferred methods will be described in more detail below in conjunction with FIGS. 4C–4G. As shown in the figures, the triangles comprise planar surfaces having three vertices. The vertices of the adjacent triangles comprise the three points forming the initial triangle plus a remainder of points, each computed as a weighted average of nearby points in the cloud of points and in which the selection criteria for the points forming the vertex and the testing of the vertex against rejection criteria is satisfied. As such, the final surface representation is a weighted average surface representation which requires much less data to represent the surface than the initial point cloud, since it reduces the number of points to represent the surface down to only the vertices. Since each vertex (other than the vertex of the initial triangle) is a weighed average of nearby points, the final surface configuration is a weighted average surface.

Figure 4A:
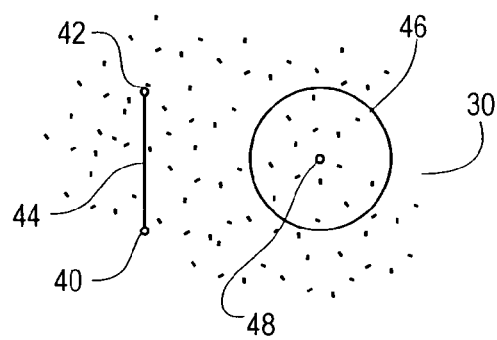
FIGS. 4A–4G shows how the surface of FIG. 3 is constructed from a cloud of points, and showing several different methods by which a new triangle is formed.

Referring now in particular to FIG. 4A, a portion of the point cloud 30 is shown. The manner of selecting the initial triangle will be described first. The preferred embodiment makes use of the following features, stored as memory files: a list of all the points in the point cloud, each point associated with both three dimensional coordinate (X, Y, Z) values and an index (number, e.g., point number); a list of all "open edges", as defined herein; a list of all the "closed edges", defined herein, and a list of all triangles that are created by the process which form the single mesh surface.

The process starts by selecting a first point 40. The first point may be any randomly selected point in the point cloud, the first point (index=1), the last point (index=n, where n is the number of points in the point cloud), or otherwise. The method continues by selecting a second point 42, which may also be a point in the point cloud. The point 42 could be selected in a variety of possible methods, such as any point in the point cloud that has a distance from the first point 40 that does not exceed a specified threshold; a point having the closest index number to the index number of the first point, or the point could be constructed from averaging X, Y and Z values from set of points in the vicinity of the first point 40. (The first point could similarly be selected).

After the first two points are selected, an edge 44 is constructed joining points 40 and 42. The task is now to select a third point forming the third vertex of the first triangle. In a preferred embodiment, a third point 46 is selected as a weighted average of points in a region that is a certain distance way from the edge 44, not too close, not too far (the distance criterion could also use the first and second points instead of the edge). The aim here in selection of the third point (or, more generally, any new point forming a vertex of a triangle in the surface after creation of the initial triangle) is to continue as homogeneously as possible the existing surface structure (the single mesh that has already been generated) and ensure that the deviation between the surface generated with the new point and the source data points is kept to a minimum. The minimization of the deviation is achieved by using a weighted mean of all source data points to select the third point 46. Here, a weighted mean of all source data points is formed for this purpose, which do not exceed a certain maximum distance from the edge 44 and which are not located in certain exclusion areas. These exclusion areas comprise all areas located "behind" the edge (to the left of the edge 44) or behind the neighboring edges—and hence within one of the triangles referencing one of the points of the edge. The points are weighted such that those points that contribute to the formation of a triangle whose sides are as equal as possible are assigned the greatest relative weight. But if the mean variation of the normals of the source data points involved (measure of surface curvature) or the angle of the triangle formed with the aid of the new point with the other triangle of the open edge exceeds a threshold value, then the point is rejected, because excessive deviation of the new triangle from the source data points is to be expected. In this case the formation of the mean value is repeated, the weights being changed in favor of a smaller triangle. If the procedure is successful, a new triangle which references the two points of the open edge and the new point is formed and the list of the open edges is updated accordingly. The process of selecting the initial third point and all the new vertices forming the single continuous surface will be explained further in conjunction with FIGS. 10A–10E below. The procedure is not successful if there are no or too few source data points in the vicinity of the edge which satisfies the selection criteria. In this case the edge 44 remains "open."

Figure 4B:
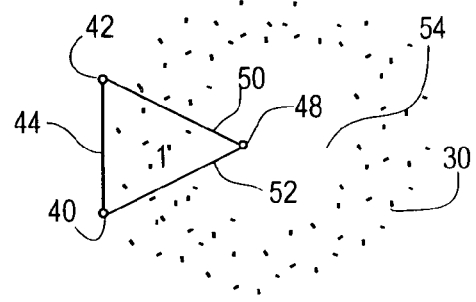

This can be seen in the example of FIGS. 4A and 4B. The points in the area bounded by the curve 46 are used in this example, the boundary 46 including points that are within a pre-set maximum distance from the edge 44. The points may also be away from the edge by a pre-set minimum amount. A weighted averaging of the points in the region is performed and the resulting weighted average of X, Y and Z values are used to construct a new point 48. The resulting triangle 1 has sides or edges 50 and 52. These edges 50 and 52 are added to the list of open edges stored in memory. The points in the region 46 that were weighted to arrive at point 48 are "deleted" from the list of points, as indicated by the void 54 of points indicated in FIG. 4B. By "deleted", we mean that the points are marked such that the points are not used further in the modeling procedure. The underlying points in the point cloud are not actually "deleted" in the literal sense.

Figure 4C:
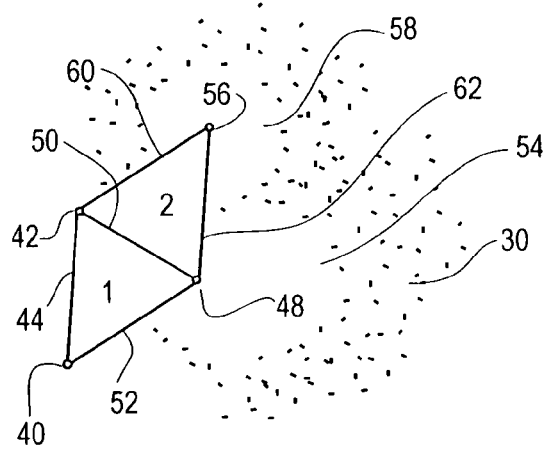

The process proceeds by selecting another open edge, for example edge 50, and constructing a new triangle formed by the edge 50 and another point derived from the point cloud. The area within triangle 1 is in an exclusion area, so the algorithm seeks points in the "front of the edge", or to the upper right of triangle 1 in FIGS. 4B and 4C. A weighted average of points in the boundary of points to consider for the open edge is performed, and the result is the selection of a new point 56, shown in FIG. 4C, provided the new vertex 56 satisfies a selection criterion described below in FIG. 10E, i.e., the angle between a surface normal vector from triangle 2 and the surface normal vector of triangle 1 does not exceed a predefined threshold value. The set of points in the point cloud used to select point 56 are "deleted" from the cloud of points, indicated by the void 58. Now, new triangle 2 is constructed, consisting of original point 42, and new points 48 and 56. The new triangle 2 has open edges 60 and 62, while edge 50 is deleted from the "open edge" list and instead is added to the "closed edge" list. As will be appreciated from the above examples, an "open edge" is a line segment joining two points forming an edge of a triangle in the surface model, which is shared by only one triangle, for example edge 52 or edge 44. Conversely, a "closed edge" is one in which the edge is common to two triangles, such as edge 50 in FIG. 4C.

Figure 4D:
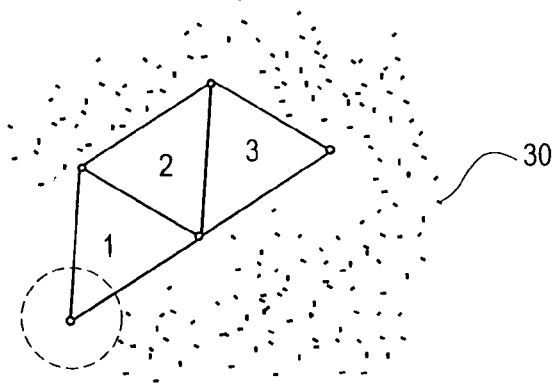
Figure 4E:
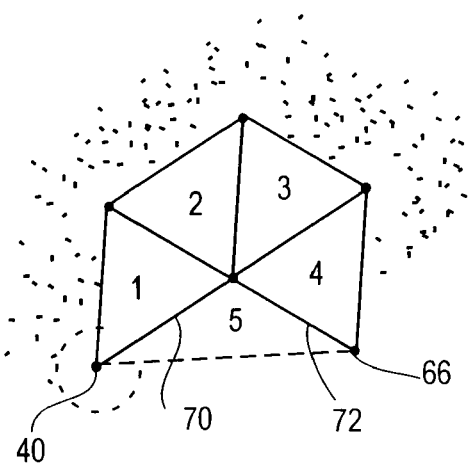

The process of selecting new points and triangles continues as shown in FIGS. 4D and 4E, showing the construction of triangles 4 and 5. As shown in FIG. 4E, a triangle can also be formed by connecting two points 40 and 66 of different triangles, in which the included angle of the open edges that join the two triangles (edges 70 and 72 in FIG. 4E) meets some requirement or rule, such as the included angle is an acute angle (less than 90 degrees, a preferred embodiment for the teeth application), the included angle is less than 145 degrees, or the included angle is less than 180 degrees, or the length of the new edge is less than a pre-set maximum distance.

Figure 4F:
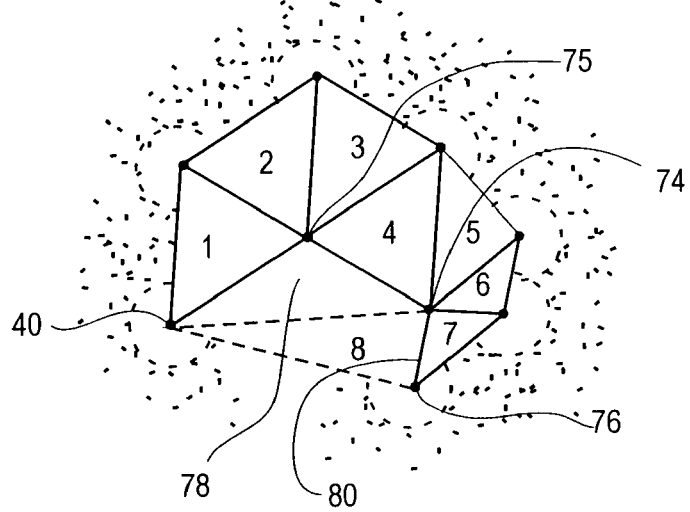
Figure 4G:
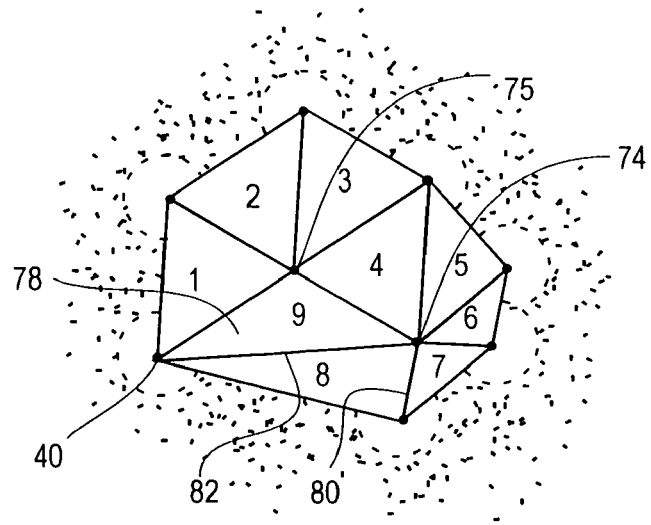

FIGS. 4F and 4G show another example of how triangles may be created from existing points in the surface. The surface consists in this situation seven triangles, numbered 1–7. Triangle 8 is constructed by connecting existing vertices 74, 76 and 40. This forms a hole 78. The hole is assigned a triangle by connecting points 74, 75 and 40. Edge 82 is common to triangles 8 and 9 and is deemed a closed edge.

Thus, in a preferred embodiment, the process includes instructions for forming triangles from either the point cloud or previously identified vertices in the surface. The algorithm generally generates, in succession, either:

2 new points (=starting edge of a triangle), as in FIG. 4A; or 1 new point and 1 triangle consisting of this point and 2 points identified in an earlier step (FIG. 4C, the selection of new point 56 forming the second triangle); or 1 triangle which references 3 points generated in an earlier step (e.g., the generation of the triangle 5 in FIG. 4E, or the generation of triangles 8 and 9 in FIGS. 4F and 4G).

Thus, at the time of its generation, each triangle (except the first or starting triangle) has at least one common edge with a triangle generated in an earlier step. A list of "open edges" of all triangles already generated is kept for this purpose. New triangles are always formed along these edges (exception: starting triangles), i.e., such an open edge is selected for generating a new triangle. Whether a point and a triangle or only a triangle from exiting triangles, will be formed is determined by rules that are coded in the software, such as by the angle of this edge with the neighboring open edges, by other open edges that may exist in the neighborhood and by the point distribution of the source data near the edge.

As indicated by the voids in the point clouds in FIGS. 4B–4G, all source data points involved in forming a new vertex of a triangle in the surface are "deleted". i.e., are marked to exclude them from the rest of the modeling procedure.

Generation of a Triangle which References 3 Existing Points

The preferred embodiment includes rules for generating triangles without generating a new point, i.e., from existing vertices of triangles already created. In a first possible rule, new triangles could be created when two adjacent open edges together form acute angle. A triangle can be formed in this case, which is situated between these two edges, i.e., which references the 3 points of the two edges. In a refinement of this rule, this triangle is formed only if the mean distance between the source data points located above (or below) this triangle and the triangle area does not exceed a certain threshold.

As a second possibility, a triangle can be created when point of another open edge lies near the open edge (and in front of it). This is the example of creating triangle 8 in FIG. 4G. In this case a triangle can be formed which references the open edge 80 and this third point 40. But just as in the previous case, this triangle (8 in FIG. 4G) is generated only after the measurement of the distance has been carried out successfully. This way of forming triangles is the basis for the "growing together" of the single mesh, i.e., for enabling it also to render cylindrical, spherical or other topologies.

As a third possible example, triangles are constructed to fill holes, that is when three open edges together limit a triangular hole. The hole is closed by a triangle which references the three vertices of these three edges.

Figure 5:
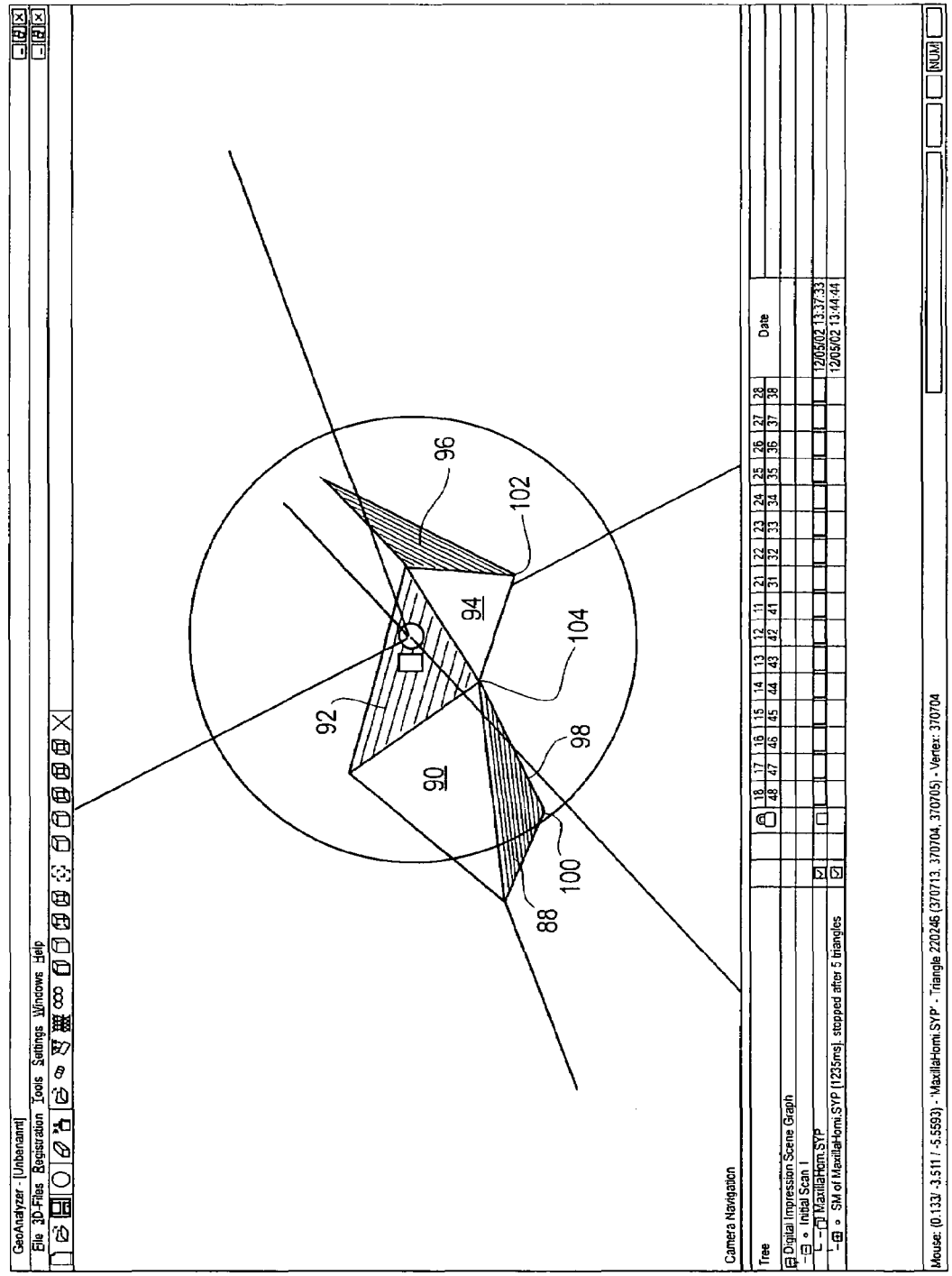
FIGS. 5, 6 and 7 shows how new triangles are constructed in the computer in three dimensions.
Figure 6:
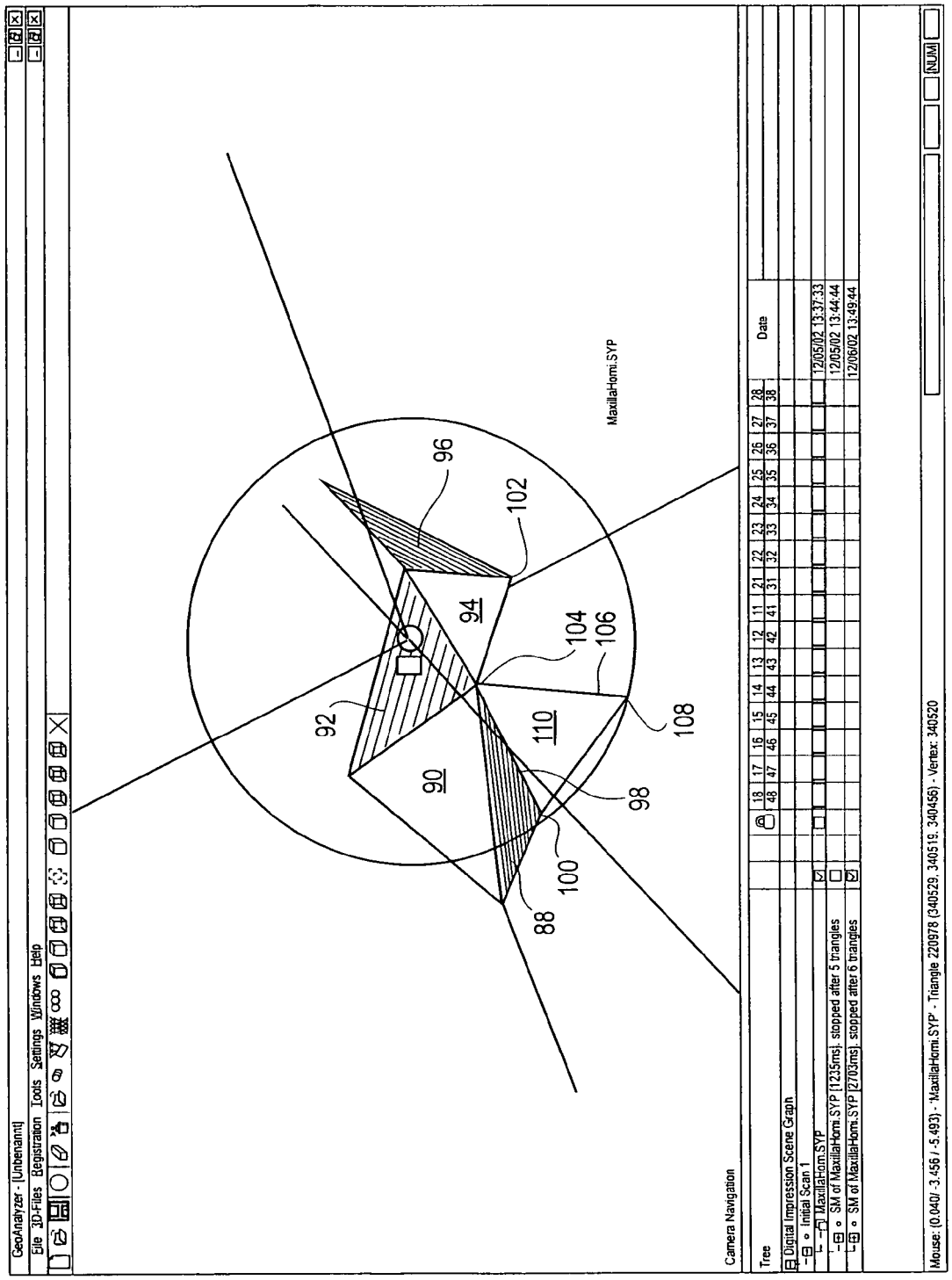
Figure 7:
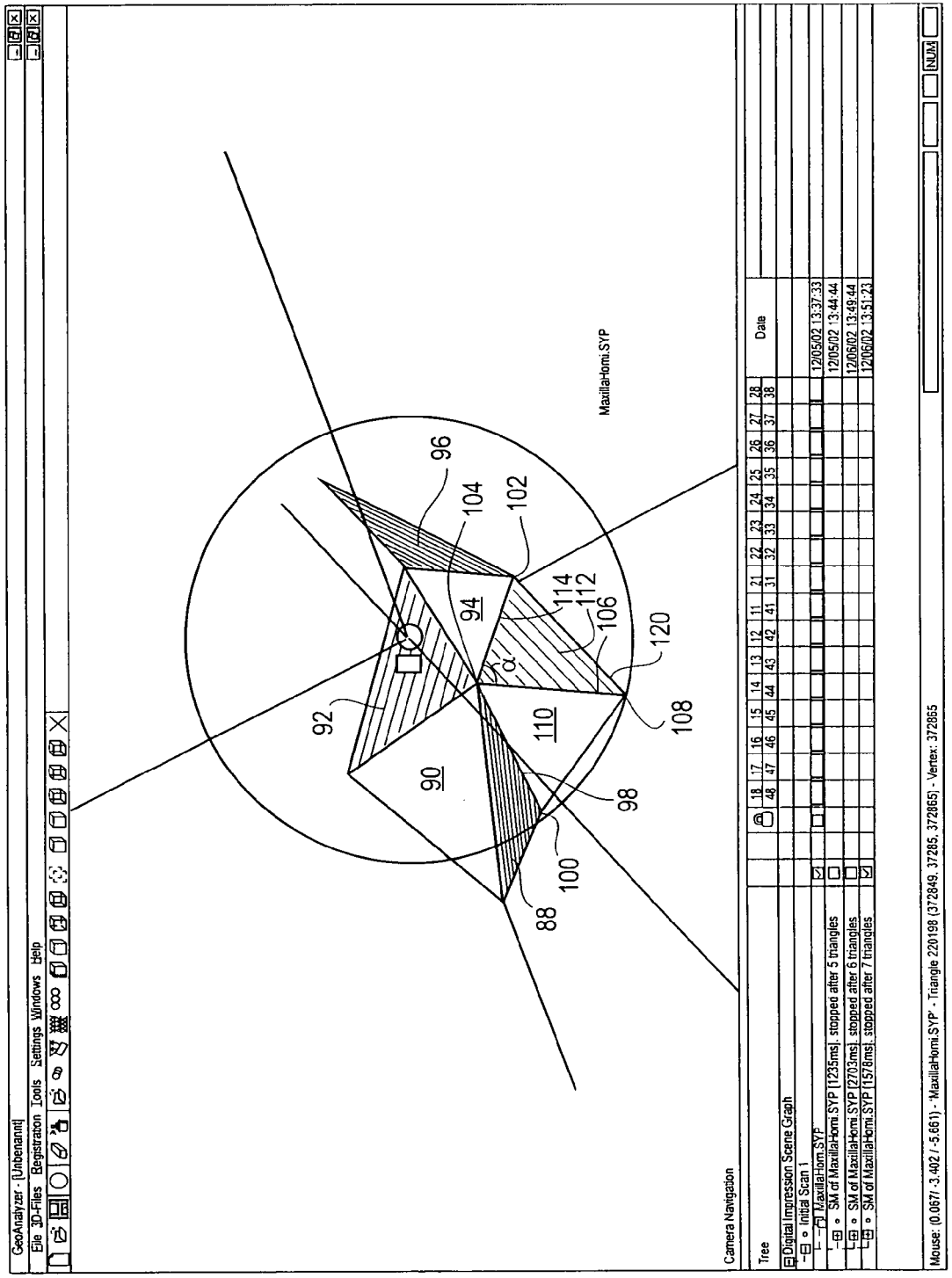

FIGS. 5, 6 and 7 shows how new triangles are constructed in the computer in three dimensions. FIG. 5 shows points in a point cloud and a single continuous triangle surface consisting of triangle surfaces 88, 90, 92, 94, 96. Edge 98 is an open edge and is the open edge that is selected to form a new triangle. In the present example, the rules for generating triangles would not permit a triangle to be formed by connecting vertices 100 and 102 since the distance between the two vertices exceeds a threshold. Therefore, the process will create a new vertex from the points in the point cloud, which will be part of a triangle containing points (vertices) 100 and 104 and include the open edge 98. Thus, as described above, a weighted average of points is performed for points within a threshold distance from the open edge 98 and a new vertex is created. The new vertex is shown in FIG. 6 as point 108. This point 108, along with points 100 and 104, creates the new triangle surface 110 having an open edge 106.

Referring now to FIG. 7, the next open edge to check is edge 106. Under the rules for generating triangles that are coded in software, the process looks to see if a triangle can be formed from existing vertices using the open edge 106. In this case, we have vertices 102, 104 and 108. The included angle α between open edges 106 and 114 (sharing a common vertex 104) meets the requirements of the rule for generating triangles from adjacent open edges since angle α is acute (less than 90 degrees). Therefore, a new triangle surface 112 is formed joining vertices 102, 104 and 108. The process continues by selecting another open edge, such as edge 120 of triangle 112, and applying the rules for generating triangles from the open edge 120.

Figure 8:
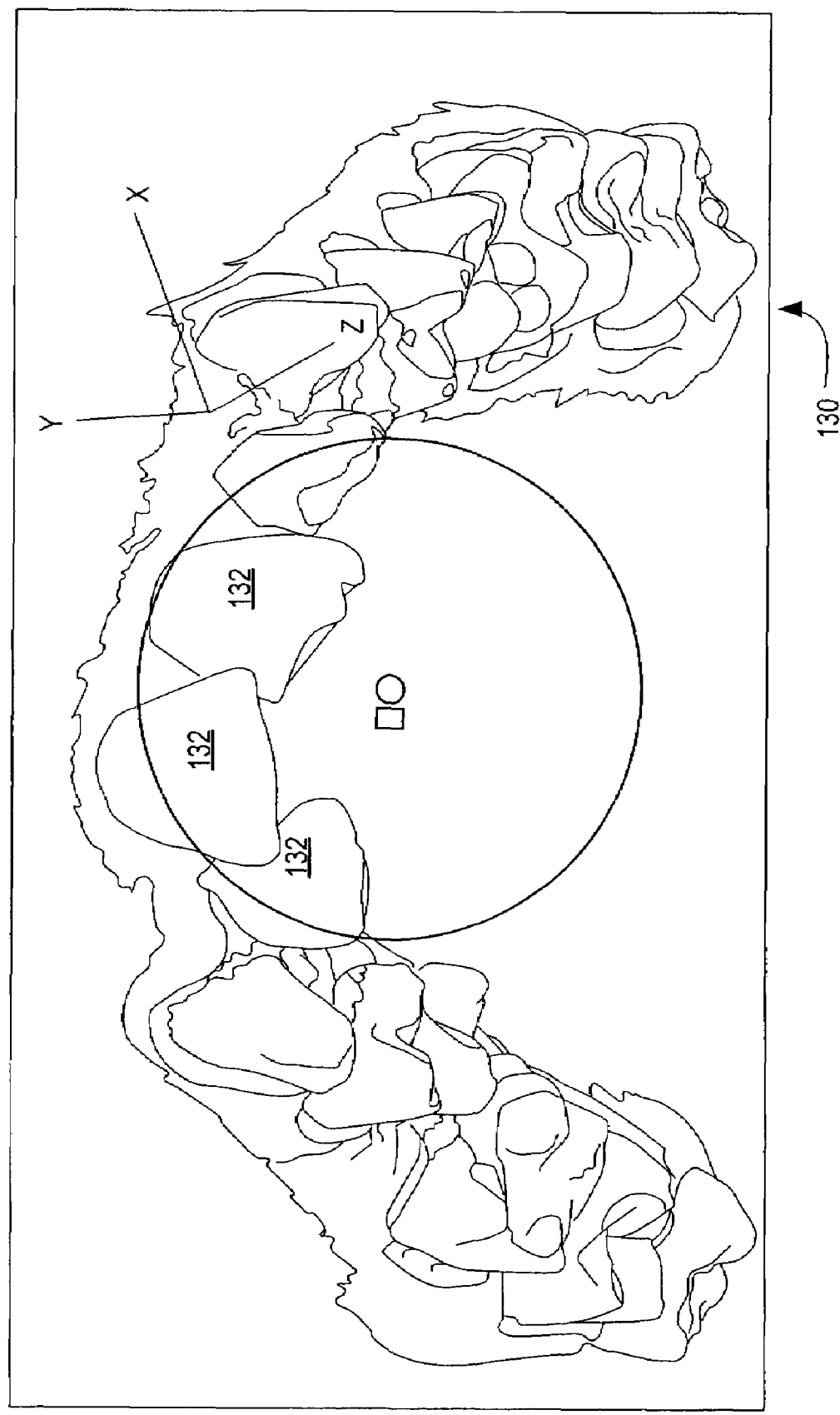
FIG. 8 shows a complete 3D model of the upper arch, including teeth, of a human as it might be displayed on a monitor of a general purpose computer, after in-vivo scanning of the arch; the scanning is used to create a cloud of points and the execution of the methods of the present invention take the resulting cloud of points and create a single 3D surface presenting the anatomical structures of the upper arch.
Figure 9:
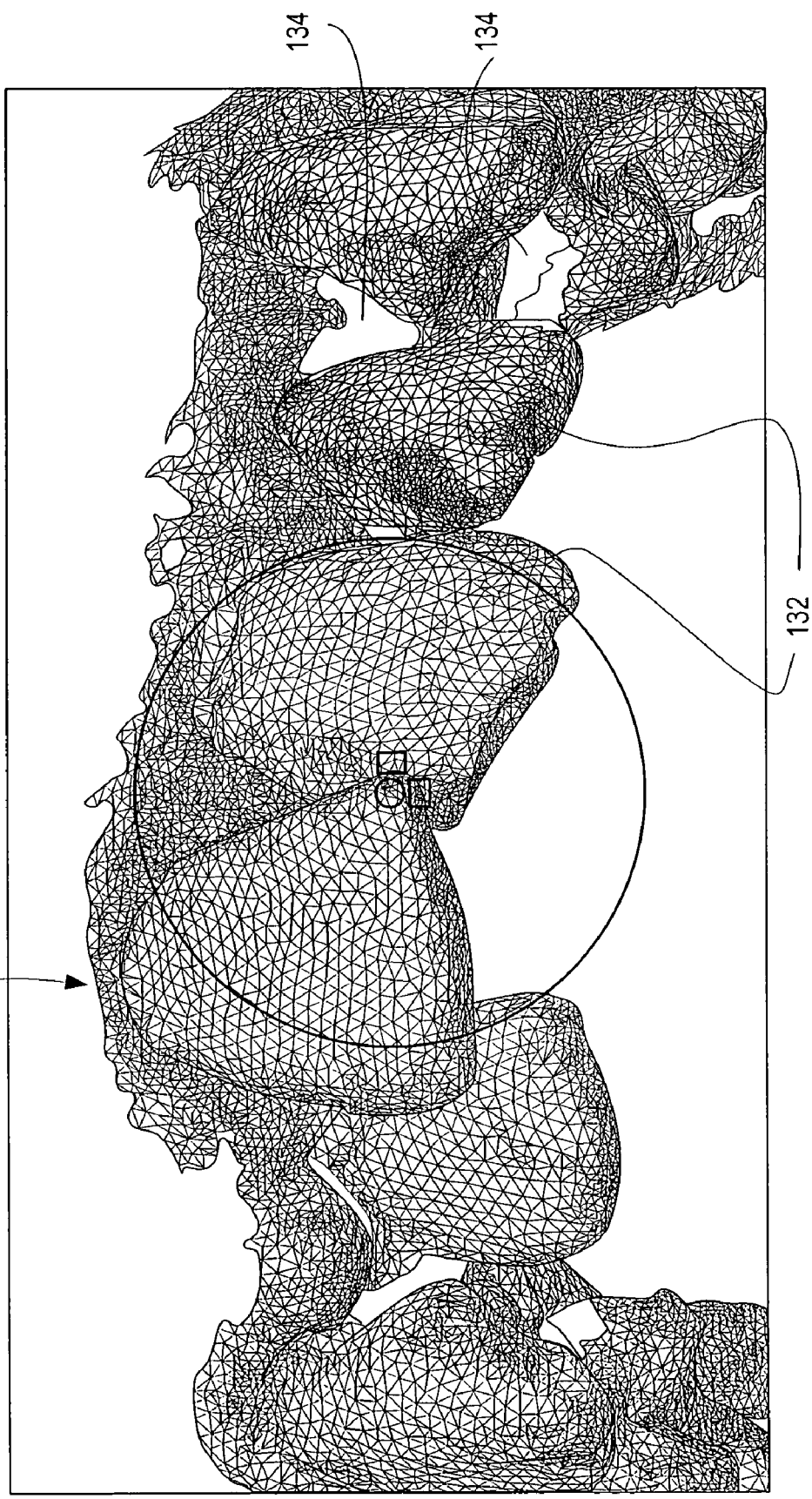
FIG. 9 shows the three-dimensional surface of FIG. 8, but this time showing a "wire-frame" model in which the edges of the triangles are indicated on the display.

As noted earlier, the process of constructing a single mesh surface can be used for any type of object. The present inventors are currently concerned with the particular problem of generating a surface model of the dentition of human patients. Such models are useful in planning orthodontic treatment using a computer, among other things. FIG. 8 shows a complete 3D model of the upper arch 130, including teeth 132, of a human as it might be displayed on a monitor of a general-purpose computer, after in-vivo scanning of the arch with a scanner of the type shown in FIG. 1. The scanning is used to create a cloud of points representing the teeth and associated anatomical structure. The cloud of points is initially represented as a large number of individual frames, which are registered to each other using a cumulative registration procedure. The methods of the present invention take the resulting cloud of points from the cumulative registration model (a noisy and inhomogeneous set of scan data) and create a single 3D surface model. This single 3D surface model is shown in FIG. 8. The modeling software includes user interface tools that allow the user to display the 3D surface model as either a continuous surface without showing the edges of the triangles (as shown in FIG. 8), or as a "wire frame model" in which the edges of the triangles are displayed. An example of the "wire frame model" is shown in FIG. 9.

The surface model may include holes or gaps in scan data, indicated at 134 in FIG. 159. These gaps are not closed by triangle surfaces since the edges of any triangles closing the gaps would exceed distance criteria for triangle edges. Hence, the gaps are either ignored or else filled in using other techniques, such by use of virtual models of teeth or otherwise. The PCT application of OraMetrix, publication no. WO 01/80761, describes several methods for closing gaps in scan data and the interested reader is referred to that document for further details on closing gaps. Additionally, the entire model may include discrete portions that are not connected to each other. For example, if the scan data is rather poor, the majority of the arch is represented as a single continuous surface and a portion of one tooth may "float" in space in the correct position. In this situation, the procedures described herein would be applied to both the point cloud representing the arch and to the point cloud representing the portion of the tooth that "floats" in position next to the point cloud of the arch.

Figure 10:
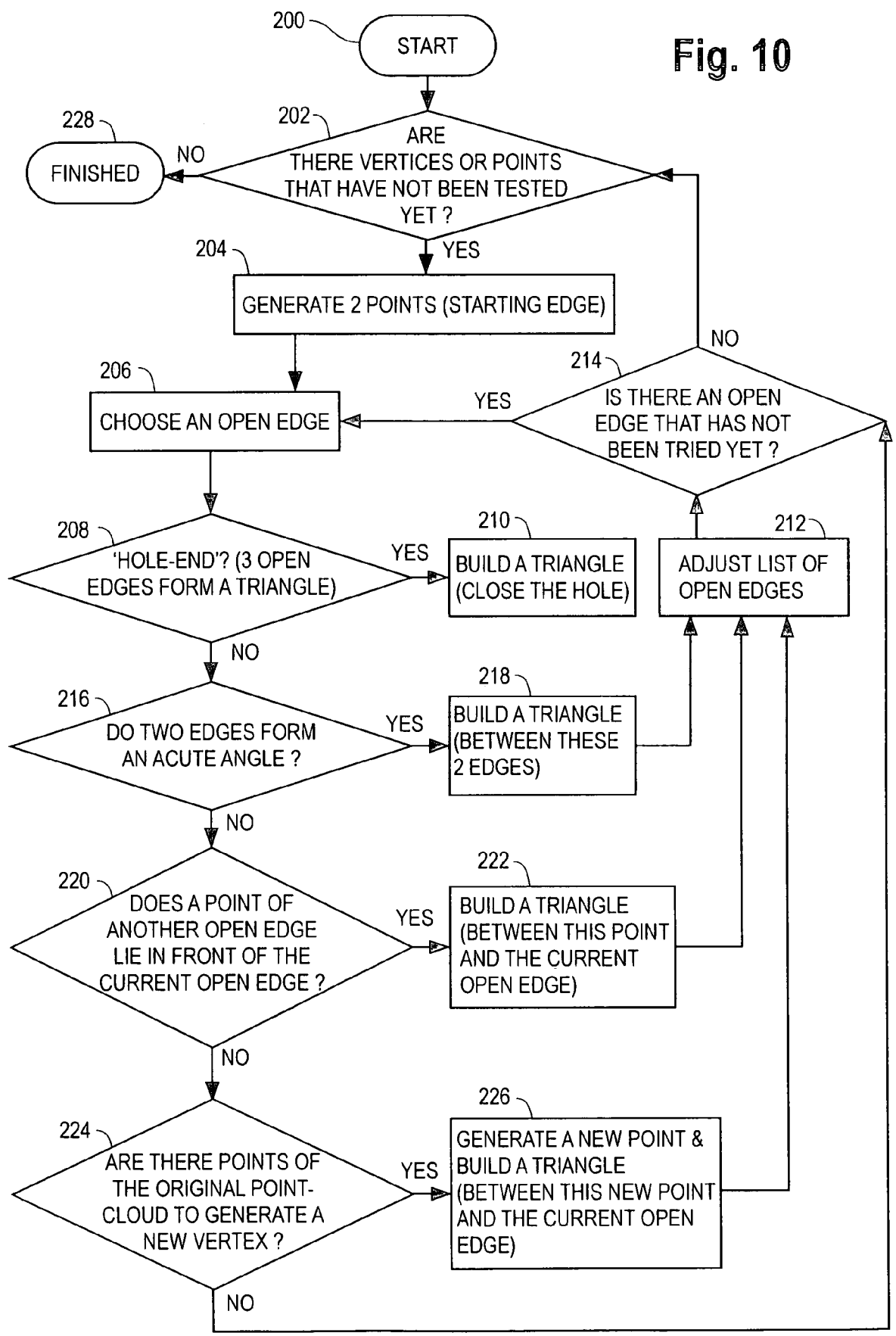
FIG. 10 is a flow chart showing a preferred sequence of software operations on a point cloud to construct a single surface from a point cloud.

FIG. 10 is a flow chart showing the execution of software instructions that create a single surface from a point cloud in one embodiment of the invention. At the start of the procedure (200), a point cloud is stored in memory. A list of points is initialized to all the points in the point cloud. Each point consists of three-dimensional coordinates. Each point is assigned an index number. The list of open edges is empty (no entries), the list of closed edges is likewise empty, and the list of triangles forming the surface is also empty.

At the first step 202, a check is made to see if there are vertices or points that have not been tested for formation of a triangle. At the beginning of the procedure, the answer of course is yes, so the process proceeds to step 204. At step 204, the process needs to generate two starting points which creates the initial open edge. This was described above in conjunction with FIG. 4A. The first and second points are generated and the open edge between the points is added to the list of open edges. The process proceeds to step 206. The process selects an open edge. At the beginning, there is only one open edge (newly created from the first two points). The process then proceeds to blocks 208, 216, 220, 224, which describe rules for generating triangles from open edges. The first rule is the test in block 208. This test asks if the open edge is a boundary of a "hole", i.e., is the open edge one of the three open edges that together form a triangle. If so, the processing reverts to block 210. A triangle is formed that closes this hole, and the list of triangles is updated. The process proceeds to block 212, where the list of open edges is adjusted to remove the open edge selected in block 206 and the other two open edges the formed the "hole".

In the case of the first open edge, of course block 208 will be answered in the negative, so the process reverts to block 216. Here, a test is made to see if the open edge selected at block 206 and tested at block 216 is adjacent to another open edge (share a common vertex) and if the angle between the edges is an acute angle. If so, the processing reverts to block 218 and a triangle is formed between these two edges (see FIG. 7, formation of triangle 112), the list of triangles is updated, and the process reverts back to process 212 and the list of open edges is adjusted accordingly.

Again, in the case of the initial or first open edge, block 220 will be answered in the negative, and so the process reverts to block 224. Here, a test is made to see if there are points in the point cloud to generate a new vertex. The block 224 is described below in conjunction with FIG. 10A. If so (and this will ordinarily be the case at the beginning of the procedure), the process proceeds to block 226. At this block, a new point is generated using the weighted average procedure described above, see FIGS. 4A, 4B and 6, and a new triangle is constructed from the new vertex and the open edge selected at block 206. The points list is then updated, in that the points used in the weighting process to form the new vertex are marked as having been used and are not used in further modeling. The processing proceeds to block 212, where the list of open edges is adjusted to add the two new open edges created by the new triangle. If, at block 224, there are no further points in the point cloud to generate a new vertex adjacent to the open edge in question, the process reverts back to step 214, where a test is conducted to see if there are other open edges that have not been tried by processing through the modules 208, 216, 220 and 224.

As is shown in FIG. 10, after the open edge has been processed by modules 208, 216, 220 and 224 and the process has succeeded in generation of a new triangle and the open edge list is adjusted at module 212, the process continues to module 214. At this module, the software asks whether there are any open edges that have not been tested by the modules 208, 216, 220 and 224. If untested open edges exist, the processing reverts back to step 206, a new open edge is selected, and the process of applying modules 208, 216, 220 and 224 to the new open edge is repeated.

If, at module 214, there are no untested open edges remaining, the process reverts to step 202 to see if there are points in the point cloud that have not been tested. If there are points in the points list that have not been tested, a new starting edge is selected in a new part of the point cloud (as indicated at step 204) and the processing of FIG. 10 repeats for the new region in the point cloud (for example, where there are "floating" regions).

The module 224 of FIG. 10 will now be described in further detail in conjunction with FIGS. 10A–10E. The goal of module 224 is to determine whether there are points in the original point cloud to generate the new vertex in the surface. This module 224 is where the selection of points in the point cloud occurs and the weighting algorithm is applied to select the new vertex, and where the new vertex is tested against rejection criteria. These procedures insure that the triangle surface matches the point cloud with a minimum of deviation.

Figure 10A:
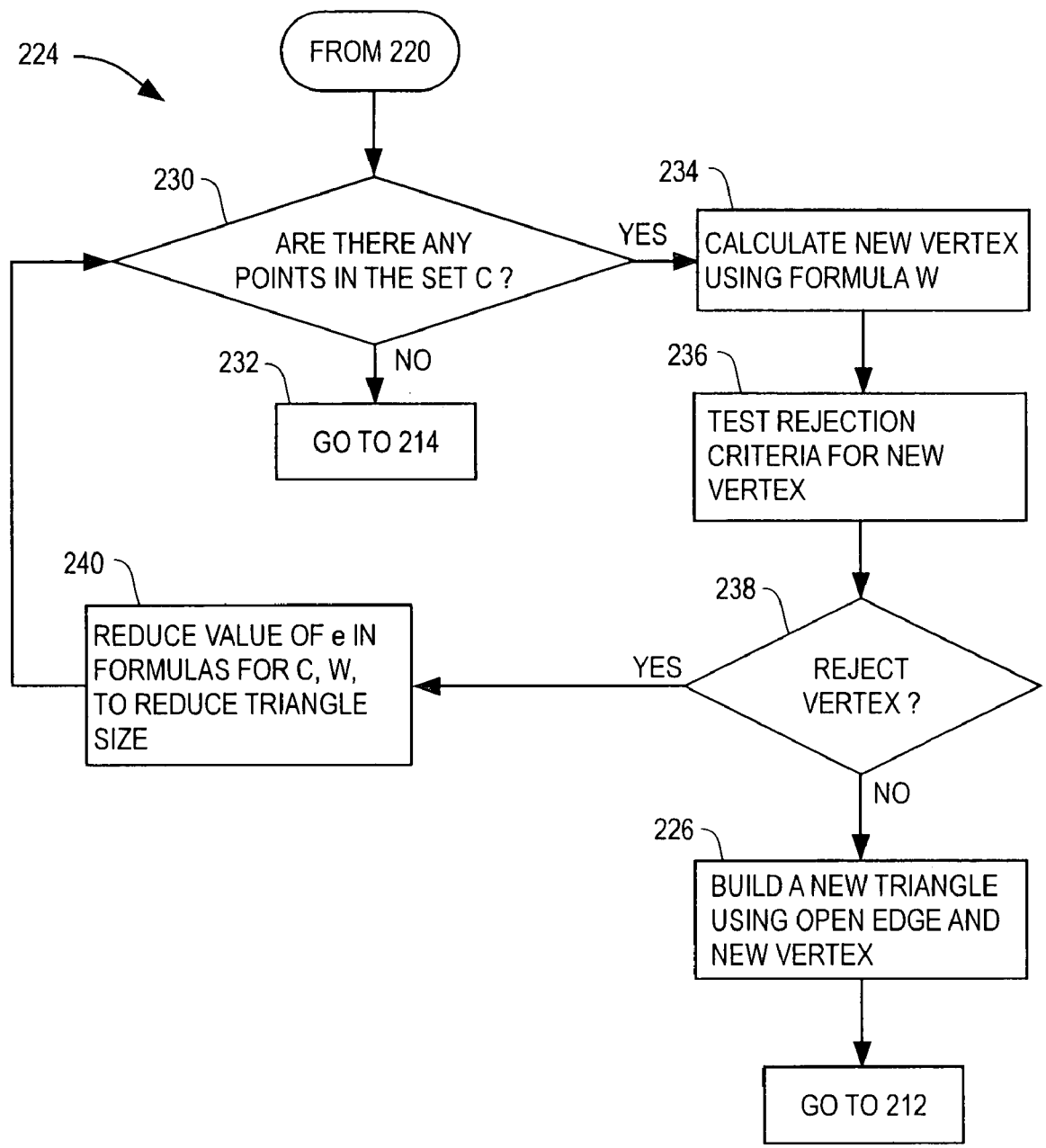
FIG. 10A is a more detailed flow chart for steps 224 and 226 of FIG. 10.

Referring now in particular to FIG. 10A, the processing of module 224 proceeds with a block 230 which determine whether there are points in the point cloud which are members of a set C. Set C is determined as follows.

Let P1, P2 be the vertices of the open edge, $\bar{n}$ the normal-vector of the existing triangle adjacent to the edge P1, P2. Then let $e=\|P_2-P_1\|$, the length of the open edge.

C is expressed as follows:

$C=\{P| \|P-P_1\|<2e \wedge \|P-P_2\|<2e \wedge (P_2-P_1)\times(P-P_1)>0\}$, which is the set of all points, which are not too far away from the two vertices of the open edge, and do not lie 'behind' the open edge. Then the new vertex V will be given formula W:

$$W: \quad V = \frac{\sum_{P \in C} P \cdot w_{P,P_1} \cdot w_{P,P_2}}{\sum_{P \in C} w_{P,P_1} \cdot w_{P,P_2}}$$

with the weights $w_{P,P_i} = e^2 - (e - \|P-P_i\|)^2$

These weights are >0 for every P∈C and have their maximum along the half-circle of points, which form equilateral triangles with P1 and P2. The weighting of points and selection of points in set C insures that the mesh tends to be quite regular.

Figure 10B:
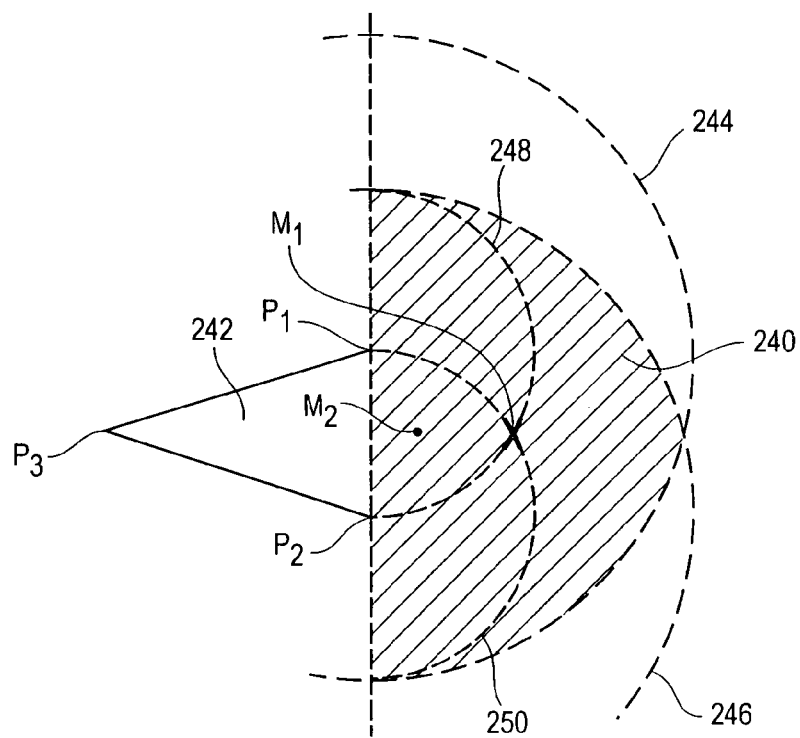
FIG. 10B illustrate selection criteria for selecting a set of points used to generate a new vertex.

FIG. 10B shows the exiting triangle consisting of points P1, P2 and P3. The line connecting P1 and P2 is the open edge, the hatched area 240 corresponds to the set C. The points in set C are delimited to the left by the plane passing through the points P1 and P2 and perpendicular to the plane containing the triangle 242; points in set C are also delimited to the right by the two half-spheres 244 and 246 with center P1 and P2, respectively, and having a radius of 2e. The point M1 shows, where the weights have their maximum. If the new vertex selected from the hatched region 240 does not satisfy the rejection criteria test in module 236 (FIG. 10A) described below, the value of e is reduced in the formulas for C and W, indicated at step 240 in FIG. 10A. The new area is indicated by the smaller half spheres 248 and 250, with point M2 being the location where the weights are a maximum.

Referring again to block 230 of FIG. 10A, if there are no points in the set C, the processing reverts back to block 214 as indicated at 232.

If there are points in the point cloud in the set C, the process proceeds to step 234 and the calculation of the new vertex using the formula W above.

At step 236, the new vertex is tested against rejection criteria for a new vertex. There are two criteria that are used in the preferred embodiment, however it is possible to just use the second criterion alone:

1: The variation of the surface normals of the source data points in the set C used to construct the vertex must be less than a threshold value; and 2. The angle between the surface normals of the adjacent triangle and the new triangle must be less than a threshold value.

Figure 10C:
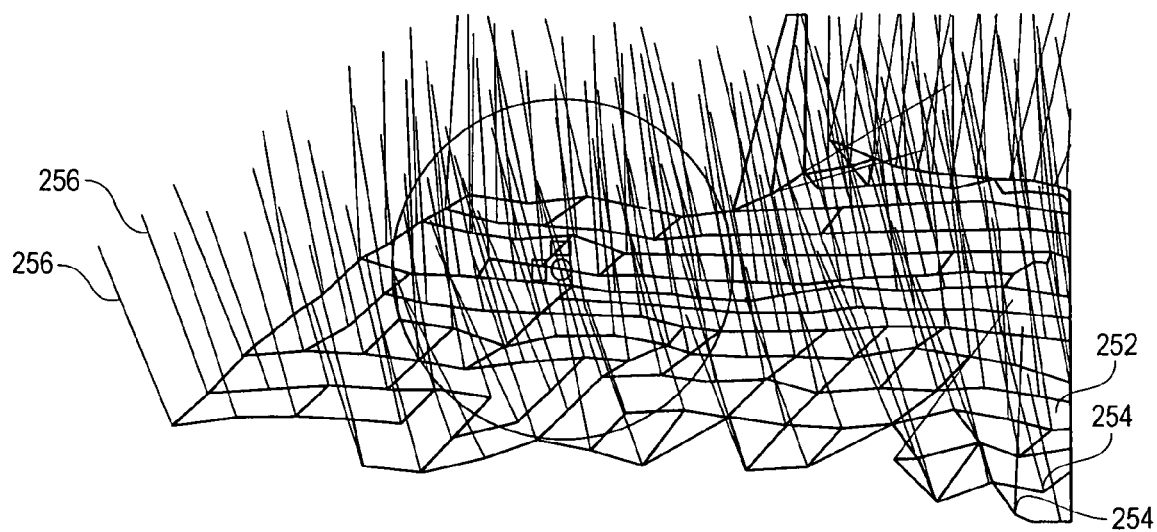
FIG. 10C–10E illustrates rejection criteria used to evaluate whether a vertex constructed according to the weighting of points selected in accordance with FIG. 10B is accepted; the rejection criteria insures that new vertices are selected which minimize surface deviation in the triangle surface from the point cloud source data.
Figure 10D:
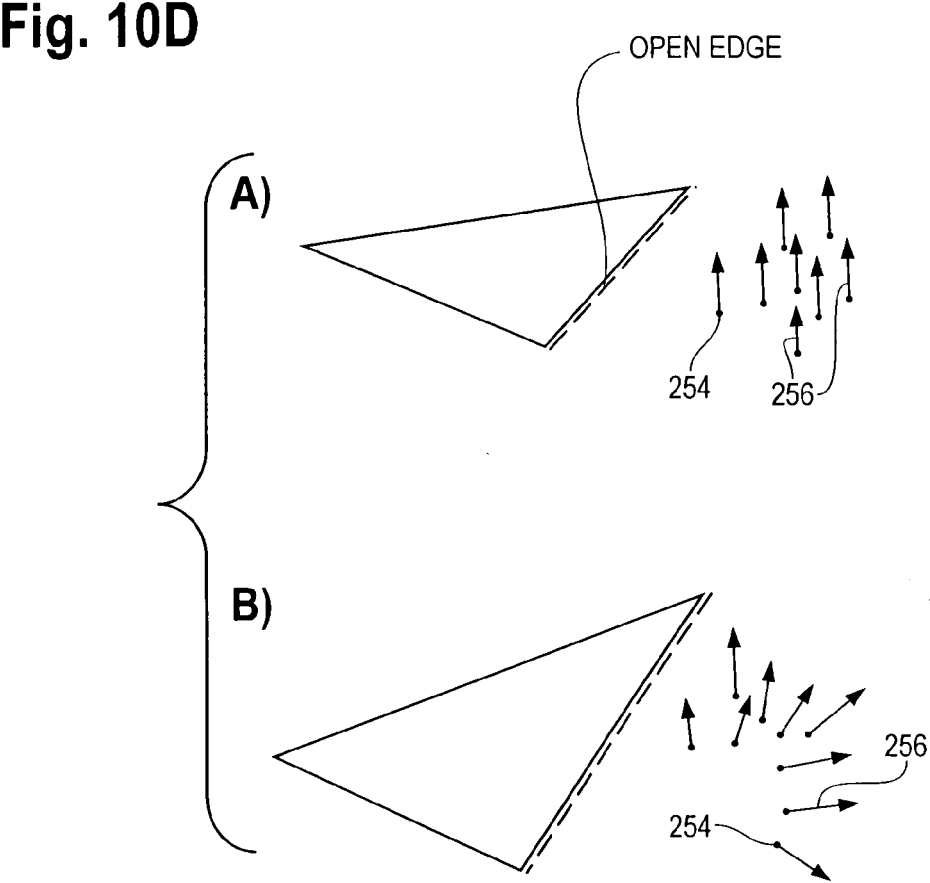

The first criterion will be explained in conjunction with FIGS. 10C and 10D. Each point in the point cloud has a surface normal, defined as a vector extending from the point in a direction normal to a weighted average of the triangle surfaces containing the point (the triangles here are triangles constructed from the source data, not in the single mesh surface). Within each frame of data forming the cloud, the data points are triangulated in a way such that points, which are next to each other in the frame, are connected by a triangle, An example of this is shown in FIG. 10C. The points 254 in the individual frame form a surface 252. The lines 256 extending from the points 254 are a weighted average of the normal vectors (not shown) of the adjacent triangles that include each point. FIG. 10D, part A, shows a situation where the surface normal vectors 356 of the points 254 in the set C are all relatively closely aligned. This indicates that there is relatively little surface curvature. If the variation in the surface normal vectors 256 is less than a threshold, the vertex selected from the set of points 254 passes the first criteria. FIG. 10D, part B, shows the situation where there is a large degree of variation in the surface normal vectors, indicating a large degree of curvature in the surface. In this situation, the vertex selected from the points in FIG. 10D, part B, would be rejected.

Figure 10E:
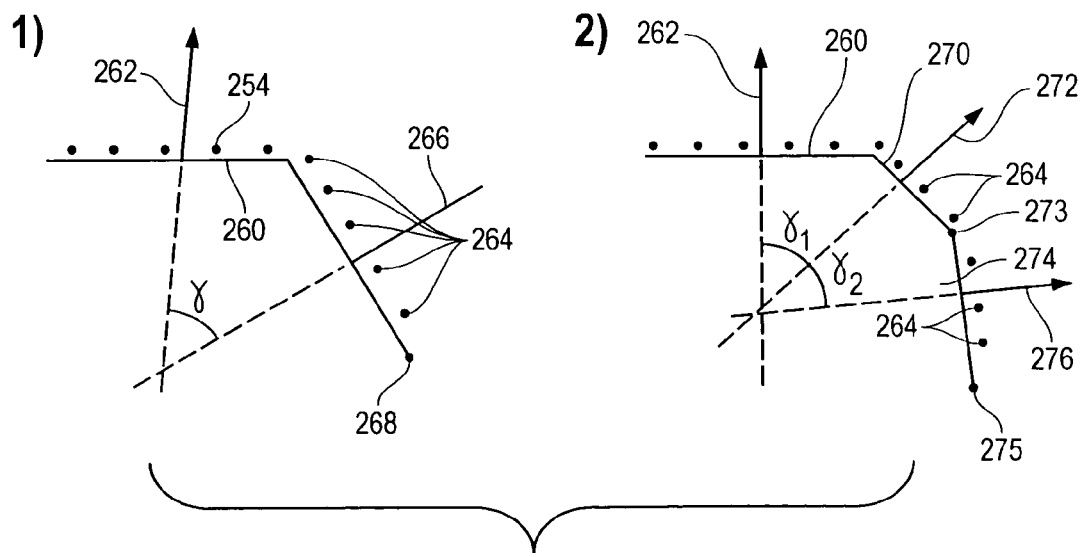

The second criteria in FIG. 10A, block 236, is a test of the angle between the existing triangle having the open edge the new triangle constructed between the open edge and the newly selected vertex. This angle must be less than a threshold value in order for the vertex to satisfy the selection criteria. As shown in FIG. 10E, part 1, an exiting triangle (shown on edge) has open edge 260, wherein the source data points 254 indicate little surface curvature. The triangle has a surface normal vector 262. If the source data points 264 are used to construct a new triangle, the triangle would have a new vertex 268 and a surface normal vector 266. The angle γ between the triangles is greater than the threshold and thus vertex 268 will be rejected. The processing of FIG. 10A indicates a rejection at 238 and the processing proceeds to block 240, where the value of $\epsilon$ in the equations for C and W are reduced. The process looks at points closer to the open edge and results in a selection of a new vertex 273, forming a triangle with edge 270 and new surface normal 272 having an angle γ1 relative to the vector 262 as shown in FIG. 10E. The angle γ1 is less than the threshold so the new vertex 273 is accepted. The processing results in a new vertex 275 being selected, in which the angle γ2 between the new surface normal 276 and the normal vector 272 is also less than the threshold. Thus, the process shown in FIGS. 10D and 10E insure that the new vertex is chosen that minimizes deviation from the point cloud, and more specifically corresponds to the localized curvature represented by the points 264.

From the above description, and with reference to the previous Figures, it will be appreciated that we have described a method for creating a surface representation of a three-dimensional object. The method includes the step of scanning the object with a scanner and storing scan data in a memory of a computer, as shown in FIG. 1. The scan data comprises a cloud of points 30, each point having three-dimensional spatial coordinates. The method includes the step of constructing within the computer an initial triangle derived from points in the scan data. See FIGS. 4A–4B and the previous discussion. The method continues with the step of repeatedly constructing within the computer adjacent triangles (see FIGS. 4C–4G and 5–7), the adjacent triangles having at least one common edge with a previously constructed triangle. The adjacent triangles have vertices comprising either the points forming said initial triangle (FIG. 4B) or points constructed from a weighted averaged of points in the scan data in the region of the vertices and in which predetermined rules or criteria for selection of vertices are obeyed. (See FIGS. 4B–4G, 10A–10E) The surface representation comprises the initial triangle and the adjacent triangles.

In still another aspect, a method has been described for creating a surface representation of a three-dimensional object from a cloud of points, each point having three-dimensional spatial coordinates. The method comprises the steps of storing the cloud of points in a memory of a computer and storing, in the memory of the computer, a list of points comprising the cloud of points and a list of open edges. The method further comprises the step of providing machine executable instructions for the computer that operate on the cloud of points, the instructions:

1) constructing an initial open edge from points in the cloud of points (FIG. 4A, edge 44);

2) constructing a triangle forming a portion of the surface representation from the open edge using predetermined rules for generating triangles forming the surface representation (FIG. 4B, forming triangle 1 using point 48 and initial points 40 and 42, steps 224 and 225 of FIG. 10);

3) adjusting the list of open edges in view of the construction of the triangle (step 212, FIG. 10);

4) checking to see if there are open edges that have not been tried yet to form a triangle forming a portion of the surface representation, and if so, repeating steps 2) and 3) (step 214, FIG. 10 and the previous discussion of FIG. 10 and FIGS. 4A–4G);

5) as steps 2), 3) and 4) execute, adjusting the list of points by marking the points in the list of points that are used to generate vertices of triangles in step 2) and not using them further in the modeling procedure (indicated by the voids in the clouds of points in FIGS. 4B–4G); and 6) repeatedly iterating steps 2), 3), 4) and 5) until the instructions have attempted to generate triangles from all open edges in accordance with the predetermined rules for generating triangles (rules 208, 216, 220 of FIG. 10), and the instructions have attempted to generate a vertex of a new triangle from all remaining points in the list of points in accordance within predetermined rule(s) for generating vertices of triangles forming the surface (step 224, FIG. 10).

It will also be appreciated that we have described a method for constructing a three-dimensional model of an anatomical structure (such as teeth or any other anatomical structure), comprising the steps of:

scanning the anatomical structure with a scanner and obtaining scan data (see FIG. 1);

converting the scan data to a cloud of points (described in the prior PCT application of OraMetrix or generally known in the art of 3D scanners);

storing the cloud of points in a memory of a computer (FIG. 1); and executing machine executable instructions in the computer, the instructions operating on the cloud of points to construct an initial triangle (FIG. 4A) and a multitude of adjacent triangles (FIGS. 4B–4G) forming a single continuous surface representing the object, the triangles comprising planar surfaces having three vertices, wherein the vertices comprise points forming the initial triangle and points computed as a weighted average of nearby points in the cloud of points.

While presently preferred embodiments of the invention have been described with particularity, variation from the disclosed embodiments is contemplated and the invention not limited solely to the disclosed embodiments. The true scope of the invention will be found by reference to the appended claims, interpreted in light of the foregoing specification.

We claim:

1. A method of creating a surface representation of a three-dimensional object, comprising the steps of:
    a) scanning the object with the scanner;
    b) storing scan data in a memory of a computer, the scan data comprising a cloud of points, each point having three-dimensional spatial coordinates;
    c) constructing, with the computer, an initial triangle from first, second and third points, wherein the first and second points are selected from the scan data and the third point is a weighted average of a set of points in the scan data and the set of points used to construct the third point meet a predetermined criteria;
    d) marking the points in the set of points used to construct the third point and not using the marked points further in the modeling procedure;
    e) selecting an open edge in the initial triangle and constructing, within the computer, an adjacent triangle to said initial triangle, said adjacent triangle sharing said open edge with said initial triangle and having a vertex, wherein the vertex is constructed from a weighted average of a set of points in the scan data and wherein the vertex is tested against one or more predetermined selection criteria to minimize surface deviation between the adjacent triangle and the point cloud;
    f) marking the points in the set of points used to construct the vertex and not using the marked points further in the modeling procedure; and
    g) successively repeating steps e) and f), to thereby construct within the computer successive adjacent triangles to open edges of previously constructed triangles using remaining undeleted points in the scan data, and forming triangles by open edges of adjacent triangles in accordance with predefined rules for generating adjacent triangles, wherein each of the points of the adjacent triangles except for the first and second points are a weighted average of a set of points in the scan data, whereby a single, weighted average surface is generated from said initial triangle and said successive adjacent triangles.

2. The method of claim 1, wherein the object scanned comprises a human anatomical object.

3. The method of claim 2, wherein the object scanned comprises one or more teeth.

4. The method of claim 1, wherein the method further comprises the steps of:
    h) storing a list of triangles constructed in the computer;
    i) storing a list of points of scan data;
    j) marking the points used for the first point, the second point, and the set of points used to construct the third point in list of points so as to not include the points further in the modeling procedure;
    k) adding the initial triangle to the list of triangles;
    l) storing a list of open edges of triangles constructed by the computer;
    m) updating the list of open edges as triangles are constructed by the computer; and
    n) updating the list of triangles and the list of points of scan data as additional adjacent triangles are created by execution of steps e), f) and g).

5. The method of claim 1, wherein the method further comprises the step of displaying on a monitor associated with said computer the composite, single, weighted average surface generated from the scan data.

6. The method of claim 1, wherein the cloud of points comprises a cumulative registration model of a series of frames, each frame comprising a set of points representing a portion of the object.

7. The method of claim 1, wherein the weighting of said weighted average is such that those points in the scan data that contribute to the formation of a triangle whose sides are as equal as possible are assigned the greatest relative weight.

8. A method of creating a surface representation of a three-dimensional object scanned with a scanner, comprising the steps of:
    a) scanning the object with the scanner;
    b) storing scan data in a memory of a computer, the scan data comprising a cloud of points, each point having three-dimensional spatial coordinates;
    c) constructing within the computer an initial triangle derived from points in the scan data;
    d) repeatedly constructing within the computer adjacent triangles, the adjacent triangles having at least one common edge with a previously constructed triangle, said adjacent triangles having vertices comprising either the points forming said initial triangle or points constructed from a weighted averaged of a set of points in the scan data in the region of said vertices; wherein said set of points are selected against predetermined selection criteria and wherein each new vertex is evaluated against one or more predetermined selection criteria to minimize surface deviation between an adjacent triangle and the point cloud;
    wherein said surface representation comprises said initial triangle and said adjacent triangles.

9. The method of claim 8, wherein the initial triangle comprises a first point, a second point, and a third point, wherein the first and second points are points in the cloud of points and wherein the third point is constructed from a weighted averaged of points in the scan data which do not exceed a maximum distance from an edge connecting said first and second points.

10. The method of claim 8, wherein the object scanned comprises a human anatomical object.

11. The method of claim 10, wherein the object scanned comprises one or more teeth.

12. The method of claim 8, wherein the method further comprises the steps of:
    e) storing a list of triangles constructed in the computer;
    f) storing a list of points of scan data;
    g) marking the points used to generate the points in the initial triangle and the vertices of the successive adjacent triangles so as to not use the points further in the modeling procedure;
    h) adding the initial triangle to the list of triangles;
    i) storing a list of open edges of triangles constructed by the computer;
    j) updating the list of open edges as triangles are constructed by the computer; and
    k) updating the list of triangles and the list of points of scan data as additional adjacent triangles are created by execution of step d).

13. The method of claim 8, wherein the method further comprises the step of displaying on a monitor associated with said computer the surface representation.

14. The method of claim 8, wherein the cloud of points comprises a cumulative registration model comprising a set of frames registered to each other, each frame comprising a set of points representing a portion of the object.

15. The method of claim 8, wherein the weighting of said weighted average is such that those points in the scan data that contribute to the formation of a triangle whose sides are as equal as possible are assigned the greatest relative weight.

16. A method of creating a surface representation of a three-dimensional object from a cloud of points, each point having three-dimensional spatial coordinates, comprising the steps of:
    a) storing the cloud of points in a memory of a computer;
    b) providing machine executable instructions stored in a computer readable medium for said computer that operate on said cloud of points, said instructions constructing an initial triangle and a multitude of adjacent triangles forming a single continuous surface representing said object, said triangles comprising planar surfaces having three vertices, wherein said vertices comprise points forming said initial triangle and points computed as a weighted average of nearby points in said cloud of points.

17. A method for constructing a three-dimensional model of an anatomical structure, comprising the steps of:
    scanning the anatomical structure with a scanner and obtaining scan data;
    converting the scan data to a cloud of points;
    storing the cloud of points in a memory of a computer; and
    providing machine executable instructions stored in a computer readable medium in said computer, said instructions operating on said cloud of points to construct an initial triangle and a multitude of adjacent triangles forming a single continuous surface representing said object, said triangles comprising planar surfaces having three vertices, wherein said vertices comprise points forming said initial triangle and points computed as a weighted average of nearby points in said cloud of points, and wherein said vertices are tested against one or more predetermined selection criteria to minimize surface deviation between the adjacent triangle and the point cloud.

18. The method of claim 17, wherein said anatomical structure comprises teeth.

19. The method of claim 18, wherein said scanner comprises a hand-held three-dimensional scanner.

20. The method of claim 18, wherein said scanner comprises a laser scanner and said anatomical structure comprises a model of teeth.

* * * * *